(12) United States Patent
Ionescu et al.

(10) Patent No.: US 10,591,315 B2
(45) Date of Patent: Mar. 17, 2020

(54) MAGNETIC SENSOR DEVICES AND METHODS FOR DETERMINING A ROTATION DIRECTION OF A MAGNETIC COMPONENT ABOUT A ROTATION AXIS

(71) Applicant: Infineon Technologies AG, Neubiberg (DE)

(72) Inventors: Mihai Alexandru Ionescu, Villach (AT); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 230 days.

(21) Appl. No.: 15/622,361

(22) Filed: Jun. 14, 2017

(65) Prior Publication Data

US 2018/0003522 A1 Jan. 4, 2018

(30) Foreign Application Priority Data

Jun. 30, 2016 (DE) .......................... 10 2016 111 984

(51) Int. Cl.
*G01D 5/16* (2006.01)

(52) U.S. Cl.
CPC ...................................... *G01D 5/16* (2013.01)

(58) Field of Classification Search
CPC ........... G01D 5/14; G01D 5/145; G01D 5/16; G01D 5/205; G01D 5/2448; G01D 5/24452; G01D 5/2451; G01P 3/487; G01R 17/10; G01R 17/105; G01R 17/12; G01R 17/15; G01R 17/18; G01R 33/09; G01R 33/091; G01R 33/093; G01R 33/095; G01R 33/096; G01R 33/098

USPC ... 324/161–180, 202, 207.12, 207.14, 207.2, 324/207.21, 207.22, 207.25, 244, 252, 324/610, 706, 725
See application file for complete search history.

(56) References Cited

U.S. PATENT DOCUMENTS

| | | | |
|---|---|---|---|
| 4,142,152 A | 2/1979 | Fincher | |
| 6,452,382 B1 * | 9/2002 | Tokunaga | G01B 7/30 324/207.21 |
| 6,630,821 B2 | 10/2003 | Shinjo et al. | |
| 7,045,997 B2 | 5/2006 | Yokotani et al. | |
| 8,726,530 B2 | 5/2014 | Hama | |
| 9,310,446 B2 | 4/2016 | Kubik | |
| 10,060,941 B2 | 8/2018 | Bai et al. | |
| 2002/0030487 A1 | 3/2002 | Shinjo et al. | |
| 2004/0017188 A1 | 1/2004 | Yokotani et al. | |

(Continued)

FOREIGN PATENT DOCUMENTS

| | | |
|---|---|---|
| CN | 101010593 A | 8/2007 |
| CN | 101243326 A | 8/2008 |

(Continued)

*Primary Examiner* — Steven L Yeninas
(74) *Attorney, Agent, or Firm* — Harrity & Harrity, LLP (57) ABSTRACT

A magnetic sensor device for determining a rotation direction of a magnetic component about a rotation axis is provided. The magnetic sensor device includes a bridge circuit with a first half-bridge and a second half-bridge. Each of the first half-bridge and the second half-bridge comprises at least one magnetoresistive structure. Further, the magnetic sensor device includes an evaluation circuit configured to determine the rotation direction of the magnetic component based on a phase difference between an output signal of the first half-bridge and an output signal of the second half-bridge.

20 Claims, 8 Drawing Sheets

(56) References Cited

U.S. PATENT DOCUMENTS

| | | | |
|---|---|---|---|
| 2006/0261801 A1 | 11/2006 | Busch | |
| 2007/0035293 A1 | 2/2007 | Fukuoka et al. | |
| 2008/0180089 A1* | 7/2008 | Stolfus | G01P 3/487 324/174 |
| 2009/0207064 A1* | 8/2009 | Feldotte | H03M 1/0607 341/155 |
| 2011/0031965 A1* | 2/2011 | Saruki | G01D 3/036 324/207.25 |
| 2016/0047852 A1* | 2/2016 | Poisson | G01R 31/025 324/522 |
| 2016/0123774 A1* | 5/2016 | Foletto | G01D 5/145 324/207.21 |
| 2016/0169985 A1 | 6/2016 | Weber et al. | |
| 2017/0045380 A1* | 2/2017 | Ueda | G01D 5/2451 |
| 2017/0276514 A1* | 9/2017 | Schmitt | G01D 5/16 |
| 2017/0307405 A1* | 10/2017 | Allen | G01D 3/08 |

FOREIGN PATENT DOCUMENTS

| | | |
|---|---|---|
| CN | 102809665 A | 12/2012 |
| CN | 103185539 A | 7/2013 |
| CN | 103777154 A | 5/2014 |
| CN | 105408756 A | 3/2016 |
| CN | 106443063 A | 2/2017 |
| DE | 102013107821 | 1/2015 |
| DE | 102014203467 | 8/2015 |
| EP | 1983307 | 10/2008 |
| JP | 2006208025 A | 8/2006 |
| JP | 2014134479 A | 7/2014 |

\* cited by examiner

MAGNETIC SENSOR DEVICES AND METHODS FOR DETERMINING A ROTATION DIRECTION OF A MAGNETIC COMPONENT ABOUT A ROTATION AXIS

RELATED APPLICATION

This application claims priority under 35 U.S.C. § 119 to German Patent Application No. 102016111984.9, filed on Jun. 30, 2016, the content of which is incorporated by reference herein in its entirety.

TECHNICAL FIELD

Examples relate to rotation detection of magnetic components. In particular, examples relate to magnetic sensor devices and methods for determining a rotation direction of a magnetic component about a rotation axis.

BACKGROUND

Magnetic sensor devices based on a magnetoresistive effect exhibit improved sensitivity and improved jitter compared to conventional sensor devices based on the Hall effect. Accordingly, a distance between the sensor device and a monitored magnetic component (e.g. a target wheel or a crank shaft) may be increased.

For many applications (e.g. crankshaft sensor), the detection of the rotation direction of the monitored magnetic component is mandatory. Sensor devices based on the Hall effect are sensitive to vertical magnetic fields, whereas sensor devices based on a magnetoresistive effect are sensitive to horizontal magnetic fields. Hence, there is usually a 90° phase shift between output signals of the two kinds of sensor types.

However, in many applications (e.g. in the automotive industry), further processing elements (e.g. an Electronic Control Unit, ECU) expect sensor output signals with the phase behavior of a sensor device based on the Hall effect. That is, conventional sensor devices based on a magnetoresistive effect may be not used with these further processing elements.

Hence, there may be a desire for magnetic sensor devices allowing to determine the rotation detection of a magnetic component and allowing compatibility with further processing elements expecting sensor output signals with the phase behavior of a Hall effect based sensor device.

SUMMARY

The desire may be satisfied by the proposed examples.

An example relates to a magnetic sensor device for determining a rotation direction of a magnetic component about a rotation axis. The magnetic sensor device comprises a bridge circuit with a first half-bridge and a second half-bridge. Each of the first half-bridge and the second half-bridge comprises at least one magnetoresistive structure. Further, the magnetic sensor device comprises an evaluation circuit configured to determine the rotation direction of the magnetic component based on a phase difference between an output signal of the first half-bridge and an output signal of the second half-bridge.

The output signals of the first half-bridge and the second half-bridge are indicative of a rotation of the magnetic component about the rotation axis due to the varying resistance of the at least one magnetoresistive structure per half-bridge. Further, the output signals of first half-bridge and the second half-bridge may be phase shifted with respect to each other due to the geometric positioning of the first half-bridge and the second half-bridge relative to each other. That is, one of the first half-bridge and the second half-bridge may response faster than the other of the first half-bridge and the second half-bridge to the rotation of the magnetic component about the rotation axis. Since the positioning of the first half-bridge and the second half-bridge with respect to each other is known, the phase difference between the output signal of the first half-bridge and the output signal of the second half-bridge may allow to determine the rotation direction of the magnetic component.

Another example relates to a magnetic sensor device. The magnetic sensor device comprises a bridge circuit with a first half-bridge and a second half-bridge. Each of the first half-bridge and the second half-bridge comprises at least one magnetoresistive structure. Further, the magnetic sensor device comprises a switching circuit configured to couple a first input node of the first half-bridge and a first input node of the second half-bridge to a first electric potential and a second input node of the first half-bridge and a second input node of the second half-bridge to a second electric potential in a first mode of operation. The switching circuit is further configured to couple the first input node of the first half-bridge and the second input node of the second half-bridge to the first electric potential and the second input node of the first half-bridge and the first input node of the second half-bridge to the second electric potential in a second mode of operation.

The first mode of operation may allow to operate the magnetic sensor device such that a differential output signal of the first half-bridge and the second half-bridge is obtained which is 90° phase shifted with respect to a magnetic field that is sensed by the magnetic sensor device. By swapping the electric potentials for one of the two half-bridges in the second mode, the output signal of this half-bridge may be shifted in phase by 90°. In the second mode of operation a differential output signal of the first half-bridge and the second half-bridge may, hence, be obtained which is substantially in phase with the magnetic field that is sensed by the magnetic sensor device. Accordingly, a differential output signal of the magnetic sensor device may in the second mode of operation be supplied to further processing elements which expect the phase behavior of a Hall effect based sensor device. The proposed magnetic sensor device may, hence, be used with further processing elements which are designed for sensor devices based on a magnetoresistive effect as well as with further processing elements which are designed for Hall effect based sensor devices. For example, in the automotive industry, the proposed magnetic sensor device may be used with ECUs which are designed for sensor devices based on a magnetoresistive effect as well as with ECUs which are designed for Hall effect based sensor devices.

A further example relates to a magnetic sensor device comprising a bridge circuit with a first half-bridge and a second half-bridge. A first resistive element of the second half-bridge is arranged between a first resistive element and a second resistive element of the first half-bridge along a spatial direction. The second resistive element of the first half-bridge is arranged between the first resistive element of the second half-bridge and a second resistive element of the second half-bridge along the spatial direction. The first resistive element of the first half-bridge and the first resistive element of the second half-bridge are coupled to a first electric potential, whereas the second resistive element of the first half-bridge and the second resistive element of the second half-bridge are coupled to a second electric potential. At least one of the first resistive element and the second resistive element of the first half-bridge comprises a magnetoresistive structure. Further, at least one of the first resistive element and the second resistive element of the second half-bridge comprises a magnetoresistive structure. A geometric center of the first half-bridge is different from a geometric center of the second half-bridge.

The arrangement of the individual resistive elements in combination with the proposed coupling to the two electric potentials may allow to obtain a differential output signal of the first half-bridge and the second half-bridge which is substantially in phase with the magnetic field of a nearby magnetic component rotating about a rotation axis. Accordingly, a differential output signal of the magnetic sensor device may be supplied to further processing elements (e.g. an ECU of an automotive vehicle) which are designed for Hall effect based sensor devices. Moreover, a phase shift between the respective output signals of the half-bridges may be used to detect the direction of the magnetic component about the rotation axis.

An example relates to a method for determining a rotation direction of a magnetic component about a rotation axis using a bridge circuit with a first half-bridge and a second half-bridge, wherein each of the first half-bridge and the second half-bridge comprises at least one magnetoresistive structure. The method comprises determining the rotation direction of the magnetic component based on a phase difference between an output signal of the first half-bridge and an output signal of the second half-bridge.

The output signals of the first half-bridge and the second half-bridge may be phase shifted with respect to each other due to the geometric positioning of the first half-bridge and the second half-bridge relative to each other. That is, one of the first half-bridge and the second half-bridge may response faster than the other of the first half-bridge and the second half-bridge to the rotation of the magnetic component about the rotation axis. Hence, the phase difference between the output signal of the first half-bridge and the output signal of the second half-bridge may allow to determine the rotation direction of the magnetic component.

Another example relates to a method for operating a magnetic sensor device comprising a bridge circuit with a first half-bridge and a second half-bridge, wherein each of the first half-bridge and the second half-bridge comprises at least one magnetoresistive structure. The method comprises coupling a first input node of the first half-bridge and a first input node of the second half-bridge to a first electric potential and a second input node of the first half-bridge and a second input node of the second half-bridge to a second electric potential in a first mode of operation. Further, the method comprises coupling the first input node of the first half-bridge and the second input node of the second half-bridge to the first electric potential and the second input node of the first half-bridge and the first input node of the second half-bridge to the second electric potential in a second mode of operation.

The method may allow to operate the magnetic sensor device in the first mode of operation such that a differential output signal of the first half-bridge and the second half-bridge is obtained which exhibits the phase behavior of a common sensor devices based on a magnetoresistive effect. Further, the method may allow to operate the magnetic sensor device in the second mode of operation such that a differential signal is obtained which exhibits the phase behavior of a Hall effect based sensor device. Accordingly, the proposed method may allow to use magnetic sensor device with further processing elements which are designed for sensor devices based on a magnetoresistive effect as well as with further processing elements which are designed for Hall effect based sensor devices.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", to name just a few examples).

The terminology used herein is for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

Figure 1:
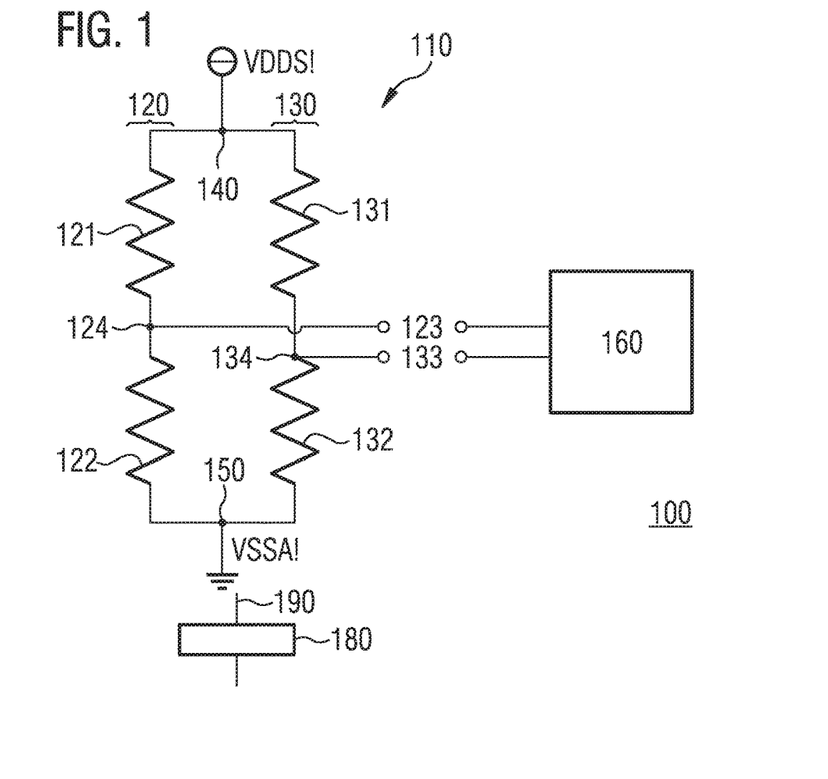
FIG. 1 illustrates an example of a magnetic sensor device for determining a rotation direction of a magnetic component about a rotation axis.

FIG. 1 illustrates a magnetic sensor device 100 for determining a rotation direction of a magnetic component 180 about a rotation axis 190. The magnetic component 180 may, e.g., comprise at least one magnetic pole of a first polarization and at least one magnetic pole of a different second polarization which are arranged alternatively along the rotation direction of the magnetic component 180 (e.g. a ferrite pole wheel). Alternatively, magnetic component 180 may comprise at least one tooth and an adjoining slot (e.g. a back-biased tooth wheel).

The magnetic sensor device 100 comprises a bridge circuit 110 with a first half-bridge 120 and a second half-bridge 130. Each of the first half-bridge 120 and the second half-bridge 130 comprises at least one magnetoresistive structure. A first input node 130 of the first half-bridge and the second half-bridge is coupled to a first electric potential (VDDS) and a second input node 150 of the first half-bridge and the second half-bridge is coupled to a second electric potential (VSSA) in order to apply a potential difference to both half-bridges.

The first half-bridge 120 comprises a series connection of two resistive elements 121, 122. At least one of the two resistive elements 121, 122 thus comprises a magnetoresistive structure. For example, the resistive element 121 may comprise a Giant MagnetoResistive/Giant MagnetoResistance (GMR) structure, i.e., a layered structure which exhibits the GMR effect. Also the other resistive element 122 may comprise a magnetoresistive structure (e.g. a GMR structure). That is, the first half-bridge 120 may comprise a first magnetoresistive structure (resistive element 121) and a second magnetoresistive structure (resistive element 122) connected in series. However, at least one magnetoresistive structure which is sensitive to the external field of the magnetic component 180 is comprised by the first half-bridge 120 of the bridge circuit 110. Accordingly, a resistance value of at least one of the two resistive elements 121, 122 may be varied according to the rotation of the magnetic component 180 about the rotation axis 190.

Similarly, the second half-bridge 130 comprises a series connection of two resistive elements 131, 132. At least one of the two resistive elements 131, 132 thus comprises a magnetoresistive structure. For example, the resistive element 131 may comprise a GMR structure. Also the other resistive element 132 may comprise a magnetoresistive structure (e.g. a GMR structure). That is, the second half-bridge 130 may comprises a third magnetoresistive structure (resistive element 131) and a fourth magnetoresistive structure (resistive element 132) connected in series. However, at least one magnetoresistive structure which is sensitive to the external field of the magnetic component 180 is comprised by the second half-bridge 130 of the bridge circuit 110. Accordingly, a resistance value of at least one of the two resistive elements 131, 132 may be varied according to the rotation of the magnetic component 180 about the rotation axis 190.

The varying resistance value of at least one of the two resistive elements 121, 122 in the first half-bridge 120 is measured by the output signal 123 of the first half-bridge 120. The varying resistance value of at least one of the two resistive elements 131, 132 in the second half-bridge 130 is measured by the output signal 133 of the second half-bridge 130. As illustrated in FIG. 1, the output signal 123 of the first half-bridge 120 is measured at an output node 124 of the first half-bridge 120, whereas the output signal 133 of the second half-bridge 130 is measured at an output node 134 of the second half-bridge 130. The output signal 123 of the first half-bridge 120 indicates a potential difference between a reference potential and a potential at the output node 124 of the first half-bridge 120. The output signal 133 of the second half-bridge 130 indicates a potential difference between a reference potential and a potential at the output node 134 of the second half-bridge 130. For example, the reference potential may be one of the first potential and the second potential applied to the input nodes of the bridge circuit 110. That is, output signals of the first half-bridge 120 and the second half-bridge 130 indicate the varying resistance of at least one of the two resistive elements in each half-bridge.

The magnetic sensor device 100 further comprises an evaluation circuit 160 configured to determine the rotation direction of the magnetic component 180 based on a phase difference between the output signal 123 of the first half-bridge 120 and the output signal 133 of the second half-bridge 130.

As indicated in FIG. 1, the first half-bridge 120 may be displaced with respect to the second half-bridge 130. Accordingly, one of the first half-bridge 120 and the second half-bridge 130 may response faster than the other of the first half-bridge 120 and the second half-bridge 130 to the rotation of the magnetic component 180 about the rotation axis 190. Therefore, the output signals 123, 133 of first half-bridge 120 and the second half-bridge 130 may be phase shifted with respect to each other. Since the positioning of the first half-bridge 120 and the second half-bridge 130 with respect to each other is known, the phase difference between the output signal 123 of the first half-bridge 120 and the output signal 133 of the second half-bridge 130 may allow to determine the rotation direction of the magnetic component 180.

The magnetic sensor device 100 may comprise one or more additional optional features corresponding to one or more aspects of the proposed concept or one or more examples described below.

Figure 2:
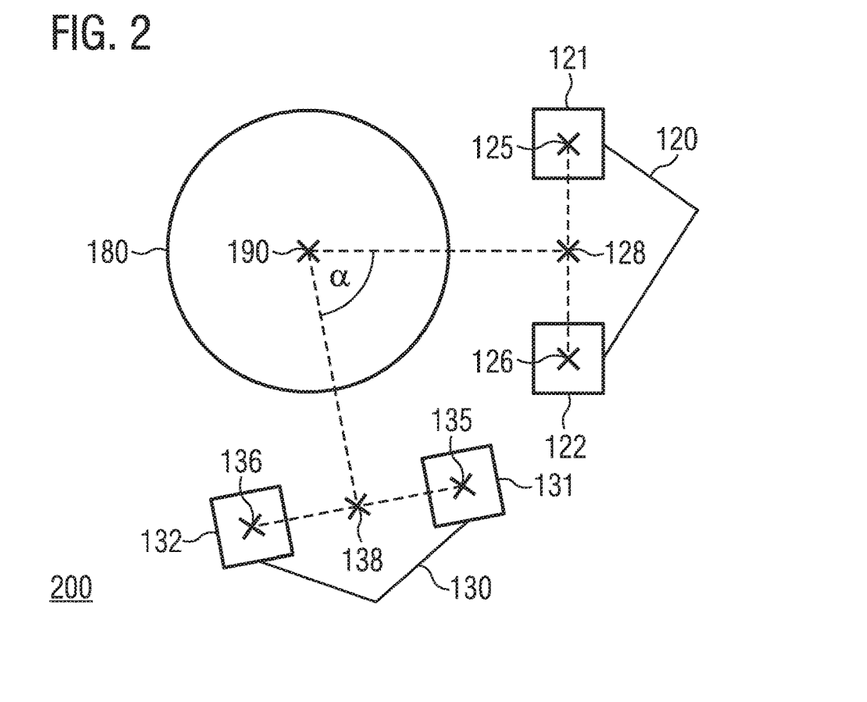
FIG. 2 illustrates an example of a positioning of a magnetic sensor device relative to a monitored magnetic component.

The first half-bridge of the bridge circuit may be displaced with respect to the second half-bridge in order to generate the output signal of the first half-bridge phase shifted with respect to the output signal of the second half-bridge in case the magnetic component rotates about the rotation axis. An exemplary positioning of a magnetic sensor device relative to a monitored magnetic component 180 is illustrated in FIG. 2. In FIG. 2, a top view of the arrangement 200 is illustrated. For the sake of simplicity, merely the two half-bridges 120, 130 of the magnetic sensor device's bridge circuit are illustrated in FIG. 2.

The magnetic component 180 rotates about the rotation axis 190. The first half-bridge 120 and the second half-bridge 130 are arranged along a circumferential direction of the magnetic component. The first half-bridge 120 comprises the two resistive element 121 and 122, wherein at least one of them comprises a magnetoresistive structure. The second half-bridge 130 comprises the two resistive element 131 and 132, wherein at least one of them comprises a magnetoresistive structure.

A geometric center 128 of the first half-bridge 120 is rotated about the rotation axis 190 with respect to a geometric center 138 of the second half-bridge 130 as indicated by the angle α between the connection lines (straights) of the rotation axis and the respective geometric centers of the half-bridges. The geometric center of a half bridge is the arithmetic mean of all the points in the half bridge. Since a half-bridge is substantially constituted by the two respective resistive elements, the geometric center of the half bridge may be the center of the line (straight) connecting the geometric centers of the two resistive elements, wherein the geometric center of a resistive element is the arithmetic mean of all the points in the resistive element. For example, the geometric center 128 of the first half-bridge 120 is substantially the center of the straight connecting the geometric center 125 of the resistive element 121 and the geometric center 126 of the resistive element 122. For example, the geometric center 138 of the second half-bridge 130 is substantially the center of the straight connecting the geometric center 135 of the resistive element 131 and the geometric center 136 of the resistive element 132.

For the resistive elements 121, 122 comprising a respective magnetoresistive structure, the geometric center 128 of the first half-bridge 120 may substantially be the center of the straight connecting the geometric centers of the respective magnetoresistive structures. Similarly, for the resistive elements 131, 132 comprising a respective magnetoresistive structure, the geometric center 138 of the second half-bridge 130 may substantially be the center of the straight connecting the geometric centers of the respective magnetoresistive structures.

If the two half-bridges do not share the same geometric center, a phase shift between the respective output signals of the half-bridges may be obtained, which can be used for determining the rotation direction of the magnetic component 180.

Figure 3:
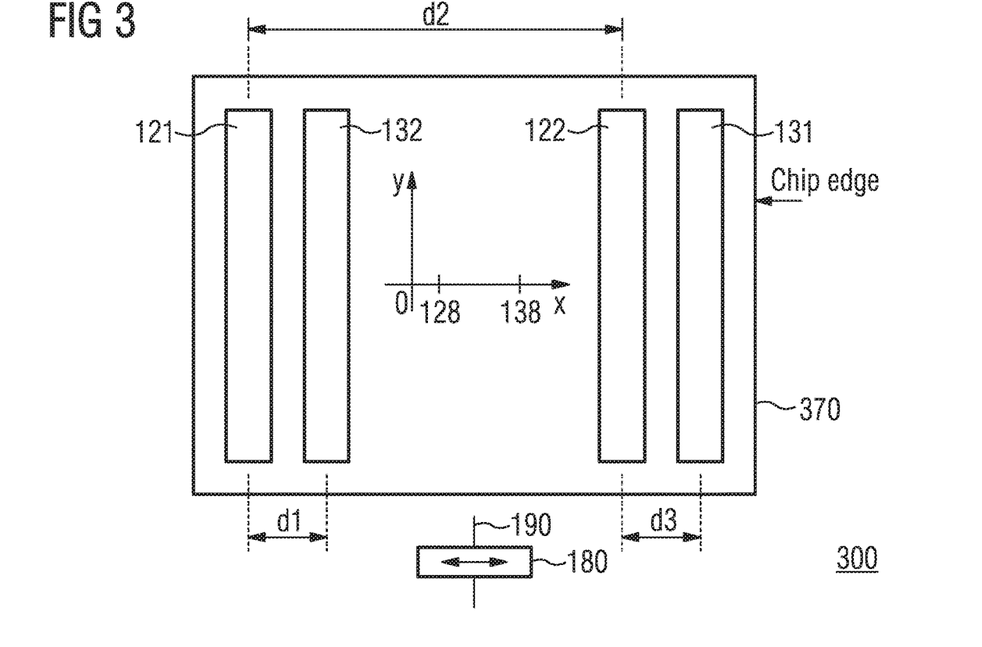
FIG. 3 illustrates an example of a bridge circuit.

An example of a bridge circuit 300 is illustrated in FIG. 3. On a semiconductor chip 370, four resistive elements 121, 122, 131, 132 are arranged, wherein the resistive elements 121 and 122 are comprised by a first half-bridge and the resistive elements 131 and 132 are comprised by a second half-bridge. At least one of the resistive elements 121, 122 comprises a magnetoresistive structure. Similarly, at least one of the resistive elements 131, 132 comprises a magnetoresistive structure. The resistive elements 121 and 132 are separated from each other by a distance d1, the resistive elements 122 and 131 are separated from each other by a distance d3 and the resistive elements 121 and 122 are separated from each other by a distance d2. For example, the distances d1 and d3 may be 0.2 mm, and the distance d2 may be 1.4 mm. As a consequence, the geometric centers of the first half-bridge and the second half-bridge are displaced with respect to each other.

For illustrative purposes only, also the magnetic component 180 rotating about the rotation axis 190 is illustrated. It is evident from FIG. 3 that the geometric center 128 of the first half-bridge is rotated about the rotation axis 190 with respect to the geometric center 138 of the second half-bridge. That is, the geometric centers of the half-bridges are shifted.

Figure 4:
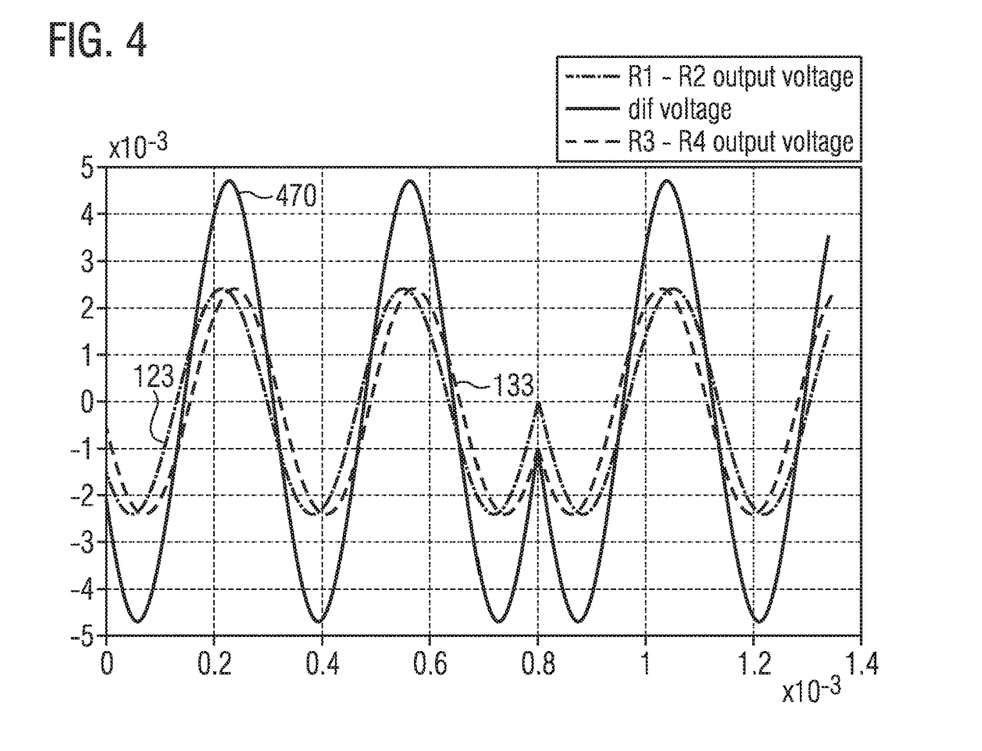
FIG. 4 illustrates an example of output signals of the first half-bridge and the second half-bridge.

Exemplary temporal courses of output signals of the first half-bridge and the second half-bridge of a bridge circuit are illustrated in FIG. 4. From time instant 0 to time instant 0.8 (time in arbitrary units), the output signal 123 of the first half-bridge leads the output signal 133 of the second half-bridge. From time instant 0.8 to time instant 1.4, the output signal 133 of the second half-bridge leads the output signal 123 of the first half-bridge. That is, the magnetic component is rotating in a first direction from time instant 0 to time instant 0.8, and is rotating in an opposite second direction from time instant 0.8 to time instant 1.4. Further, the differential signal 470 of the first half-bridge and the second half-bridge is illustrated.

The output signals of the half-bridges show a clearly defined succession of zero-crossings and extremes (like maximums and minimums), which changes when the rotation direction of the magnetic component changes. Hence, the evaluation circuit of the proposed magnetic sensor device may further be configured to determine the phase difference between the output signal of the first half-bridge and the output signal of the second half-bridge based on a phase difference between a crossing of a first predefined value (e.g. zero) of the output signal of the first half-bridge and a crossing of a second predefined value (e.g. zero) of the output signal of the second half-bridge. Alternatively, the evaluation circuit of the proposed magnetic sensor device may further be configured to determine the phase difference between the output signal of the first half-bridge and the output signal of the second half-bridge based on a phase difference between an extremum (e.g. maximum or minimum) of the output signal of the first half-bridge and an extremum (e.g. maximum or minimum) of the output signal of the second half-bridge.

In a magnetic sensor device the determination of the rotation direction of the magnetic component using maximums and minimums, crossing of predefined values, or zero-crossings may allow to uses a same Analog-to-Digital Converter (ADC) which is already used for the offset compensation. A required overall chip area may be reduced compared to conventional approaches using additional comparators and amplifiers due to their offset and linearity requirements.

In some examples, the magnetic sensor device may further comprise a switching circuit configured to couple a first input node of the first half-bridge and a first input node of the second half-bridge to a first electric potential and a second input node of the first half-bridge and a second input node of the second half-bridge to a second electric potential in a first mode of operation. The switching circuit may further be configured to couple the first input node of the first half-bridge and the second input node of the second half-bridge to the first electric potential and the second input node of the first half-bridge and the first input node of the second half-bridge to the second electric potential in a second mode of operation.

The first mode of operation may allow to operate the magnetic sensor device such that a differential output signal of the first half-bridge and the second half-bridge is obtained which is 90° phase shifted with respect to the magnetic field of the magnetic component. By swapping (switching) the electric potentials for one of the two half-bridges in the second mode, the output signal of this half-bridge may be shifted in phase by 90°. In the second mode of operation a differential output signal of the first half-bridge and the second half-bridge may, hence, be obtained which is substantially in phase with the magnetic field that is sensed by the magnetic sensor device. Accordingly, a differential output signal of the magnetic sensor device may in the second mode of operation be supplied to further processing elements which expect the phase behavior of a Hall effect based sensor device. That is, the proposed magnetic sensor device may be used with further processing elements which are designed for sensor devices based on a magnetoresistive effect as well as with further processing elements which are designed for Hall effect based sensor devices. For example, in the automotive industry, the proposed magnetic sensor device may be used with ECUs which are designed for sensor devices based on a magnetoresistive effect as well as with ECUs which are designed for Hall effect based sensor devices.

Hence, a magnetic sensor device may be provided which allows to determine the rotation direction of the magnetic component and which may allow compatibility with further processing elements expecting sensor output signals with the phase behavior of a Hall effect based sensor device. Further details of the switching circuit, the relation between the output signals of the half-bridges, and the relation between the magnetic field and the differential signal will be discussed in connection with FIGS. 5 to 9, which illustrate a magnetic sensor device according to another aspect of the present disclosure.

Figure 5:
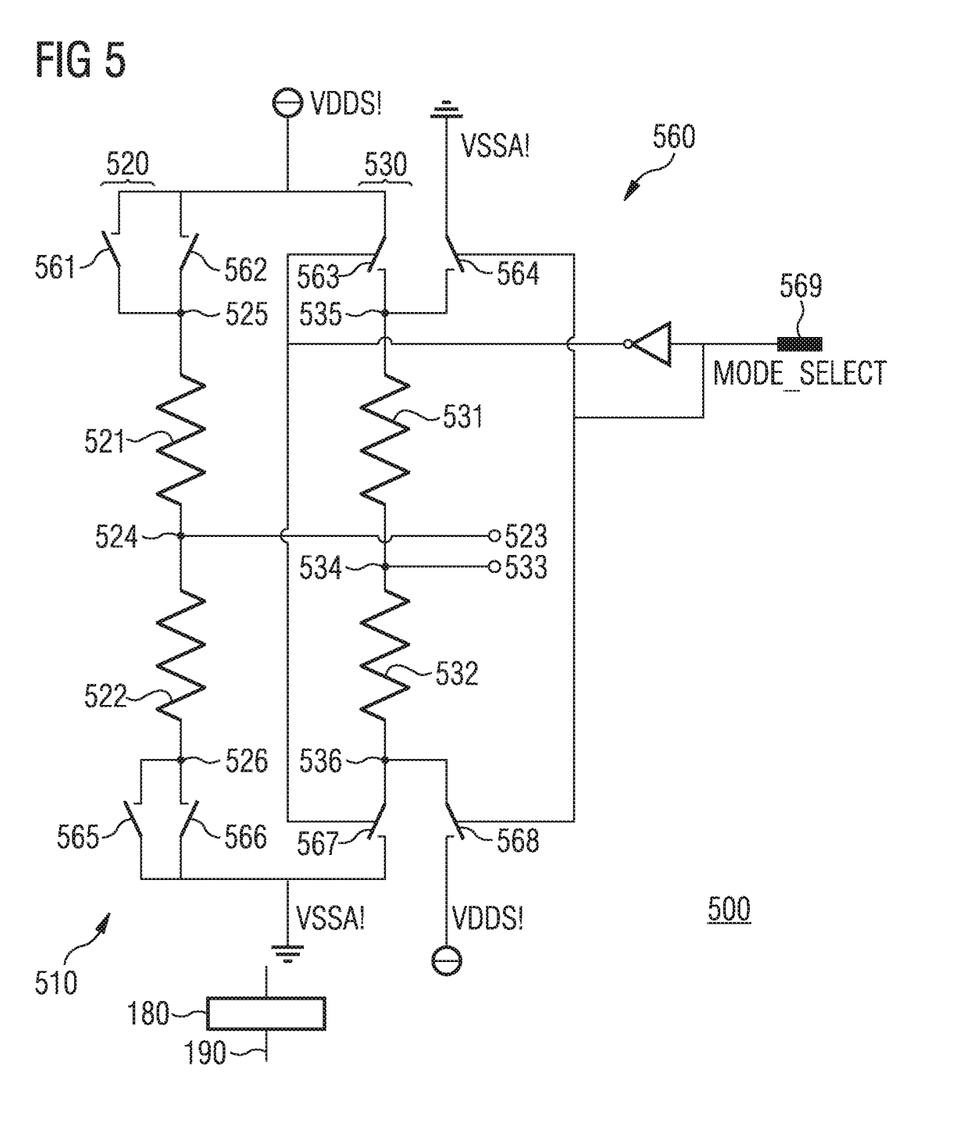
FIG. 5 illustrates another example of a magnetic sensor device.

FIG. 5 illustrates a magnetic sensor device 500. The magnetic sensor device 500 comprises a bridge circuit 510 with a first half-bridge 520 and a second half-bridge 530. Each of the first half-bridge 520 and the second half-bridge 530 comprises at least one magnetoresistive structure. As indicated in FIG. 5, the geometric center of the first half-bridge 520 may be different from a geometric center of the second half-bridge 530.

The first half-bridge 520 comprises a series connection of two resistive elements 521, 522. At least one of the two resistive elements 521, 522 thus comprises a magnetoresistive structure. For example, the resistive element 521 may comprise a GMR structure. Also the other resistive element 522 may comprise a magnetoresistive structure (e.g. a GMR structure). That is, the first half-bridge 520 may comprise a first magnetoresistive structure (resistive element 521) and a second magnetoresistive structure (resistive element 522) connected in series. However, at least one magnetoresistive structure which is sensitive to the external field of magnetic component 180 rotating about a rotation axis 190 is comprised by the first half-bridge 520 of the bridge circuit 510. Accordingly, a resistance value of at least one of the two resistive elements 521, 522 may be varied according to the rotation of the magnetic component 180 about the rotation axis 190.

Similarly, the second half-bridge 530 comprises a series connection of two resistive elements 531, 532. At least one of the two resistive elements 531, 532 thus comprises a magnetoresistive structure. For example, the resistive element 531 may comprise a GMR structure. Also the other resistive element 532 may comprise a magnetoresistive structure (e.g. a GMR structure). That is, the second half-bridge 530 may comprises a third magnetoresistive structure (resistive element 531) and a fourth magnetoresistive structure (resistive element 532) connected in series. However, at least one magnetoresistive structure which is sensitive to the external field of the magnetic component 180 is comprised by the second half-bridge 530 of the bridge circuit 510. Accordingly, a resistance value of at least one of the two resistive elements 531, 532 may be varied according to the rotation of the magnetic component 180 about the rotation axis 190.

The varying resistance value of at least one of the two resistive elements 521, 522 in the first half-bridge 520 is measured by the output signal 523 of the first half-bridge 520. The varying resistance value of at least one of the two resistive elements 531, 532 in the second half-bridge 530 is measured by the output signal 533 of the second half-bridge 530. As illustrated in FIG. 5, the output signal 523 of the first half-bridge 520 is measured at an output node 524 of the first half-bridge 520, whereas the output signal 533 of the second half-bridge 530 is measured at an output node 534 of the second half-bridge 530. The output signal 523 of the first half-bridge 520 indicates a potential difference between a reference potential and a potential at the output node 524 of the first half-bridge 520. The output signal 533 of the second half-bridge 530 indicates a potential difference between a reference potential and a potential at the output node 534 of the second half-bridge 530.

The magnetic sensor device 500 further comprises a switching circuit 560. The operation of the switching circuit is discussed in connection with FIGS. 6 and 7.

Figure 6:
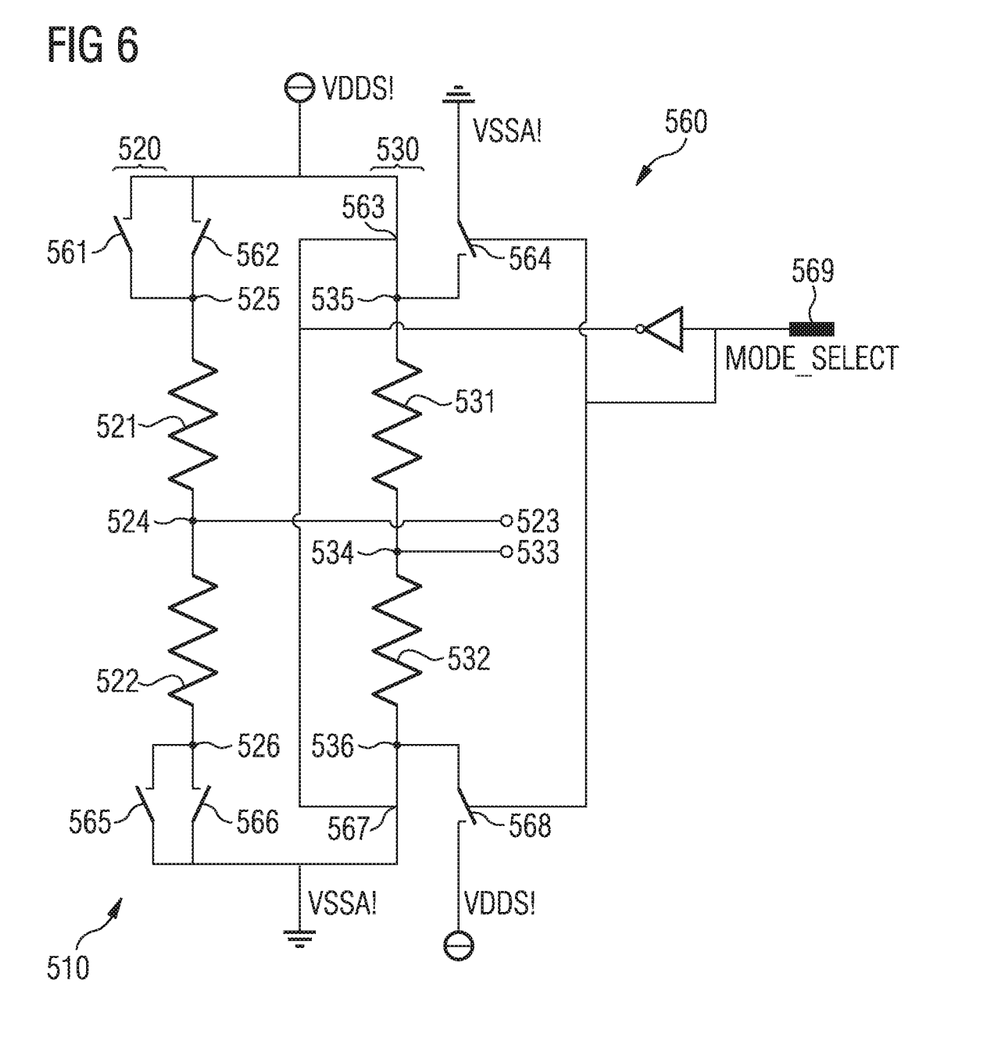
FIG. 6 illustrates the magnetic sensor device of FIG. 5 in a first mode of operation.

FIG. 6 illustrates a first operation mode of the magnetic sensor device 500. The switching circuit 560 is configured to couple a first input node 525 of the first half-bridge 520 and a first input node 535 of the second half-bridge 530 to a first electric potential (VDDS). Further, the switching circuit 560 is configured to couple a second input node 526 of the first half-bridge 520 and a second input node 536 of the second half-bridge 530 to a second electric potential (VSSA). Therefore, the switching circuit 560 may, e.g., comprise a plurality of switches 561, 562, 563, . . . , 568 connected between the respective input nodes of the half-bridges and the two electric potentials. The plurality of switches 561, 562, 563, . . . , 568 are controlled by a mode selector 569.

In the first mode of operation, the half-bridges 520, 530 of the magnetic sensor device 500 are coupled to electric potentials in a same way as the half-bridges 120, 130 of the magnetic sensor device 100 illustrated in FIG. 1. Accordingly, the output signals 523, 533 of the half-bridges 520, 530 of the magnetic sensor device 500 are identical to the output signals 123, 133 of the half-bridges 120, 130 of the magnetic sensor device 100.

Figure 7:
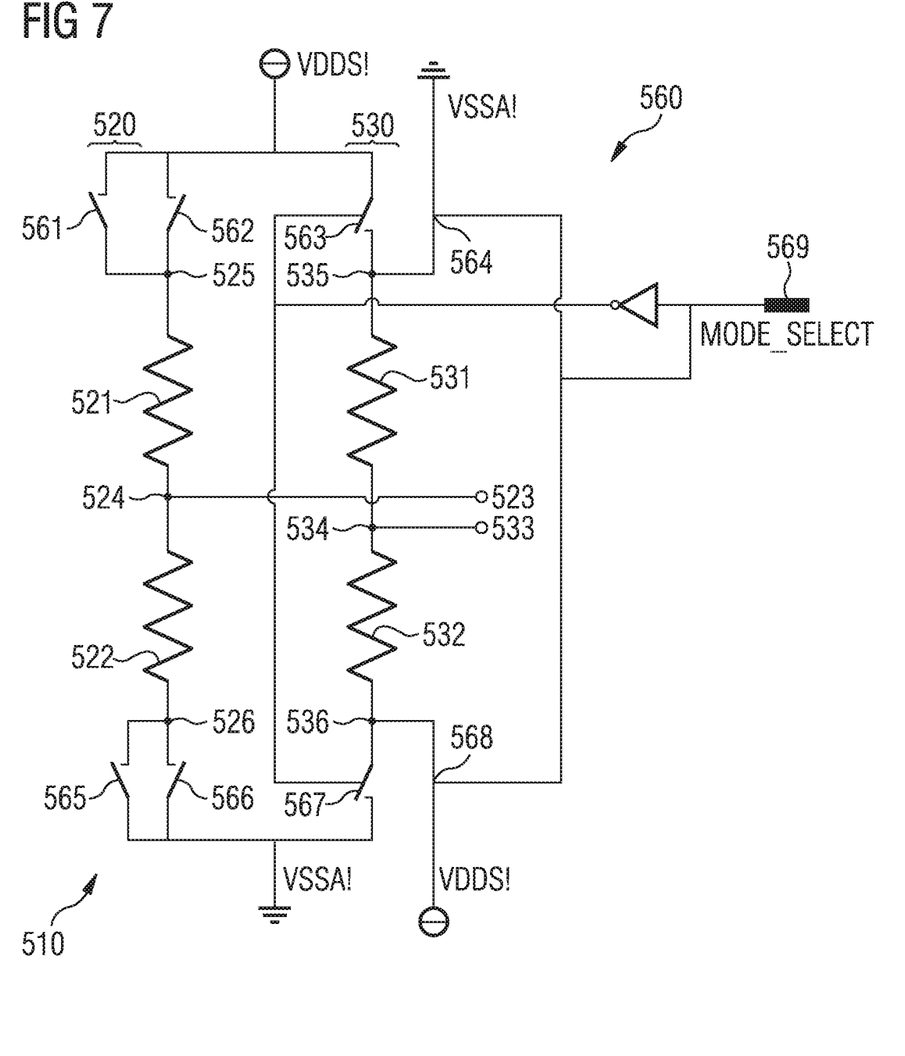
FIG. 7 illustrates the magnetic sensor device of FIG. 5 in a second mode of operation.

In FIG. 7, a second operation mode of the magnetic sensor device 500 is illustrated. The switching circuit 560 is configured to couple the first input node 525 of the first half-bridge 520 and the second input node 536 of the second half-bridge 530 to the first electric potential (VDDS). Further, the switching circuit 560 is configured to couple the second input node 526 of the first half-bridge 520 and the first input node 535 of the second half-bridge 530 to the second electric potential (VSSA). Therefore, the switch positions of the switches 563, 564, 567, 568 which are connected to the second half-bridge 530 are vice versa compared to the first mode of operation.

It is evident form FIGS. 6 and 7 that only the second half-bridge has active switches to invert the supplies. The first half-bridge uses the switches merely for symmetry. This may allow to compensate the potential drop on the active switches in order to not introduce offsets at the differential signals of the output signals 523, 533 of the first and the second half-bridge 520, 530.

In the second mode of operation, the first half-bridge 520 of the magnetic sensor device 500 is coupled to electric potentials in a same way as the first half-bridge 120 of the magnetic sensor device 100 illustrated in FIG. 1. Accordingly, the output signal 523 of the first half-bridge 520 of the magnetic sensor device 500 is identical to the output signal 123 of the first half-bridge 120 of the magnetic sensor device 100. However, the coupling to electric potentials is inverted for the second half-bridge 530 of the magnetic sensor device 500 compared to the second half-bridge 130 of the magnetic sensor device 100 illustrated in FIG. 1. Accordingly, the output signal 533 of the second half-bridge 530 of the magnetic sensor device 500 is phase shifted with respect to the output signal 133 of the second half-bridge 110 of the magnetic sensor device 100.

Figure 8:
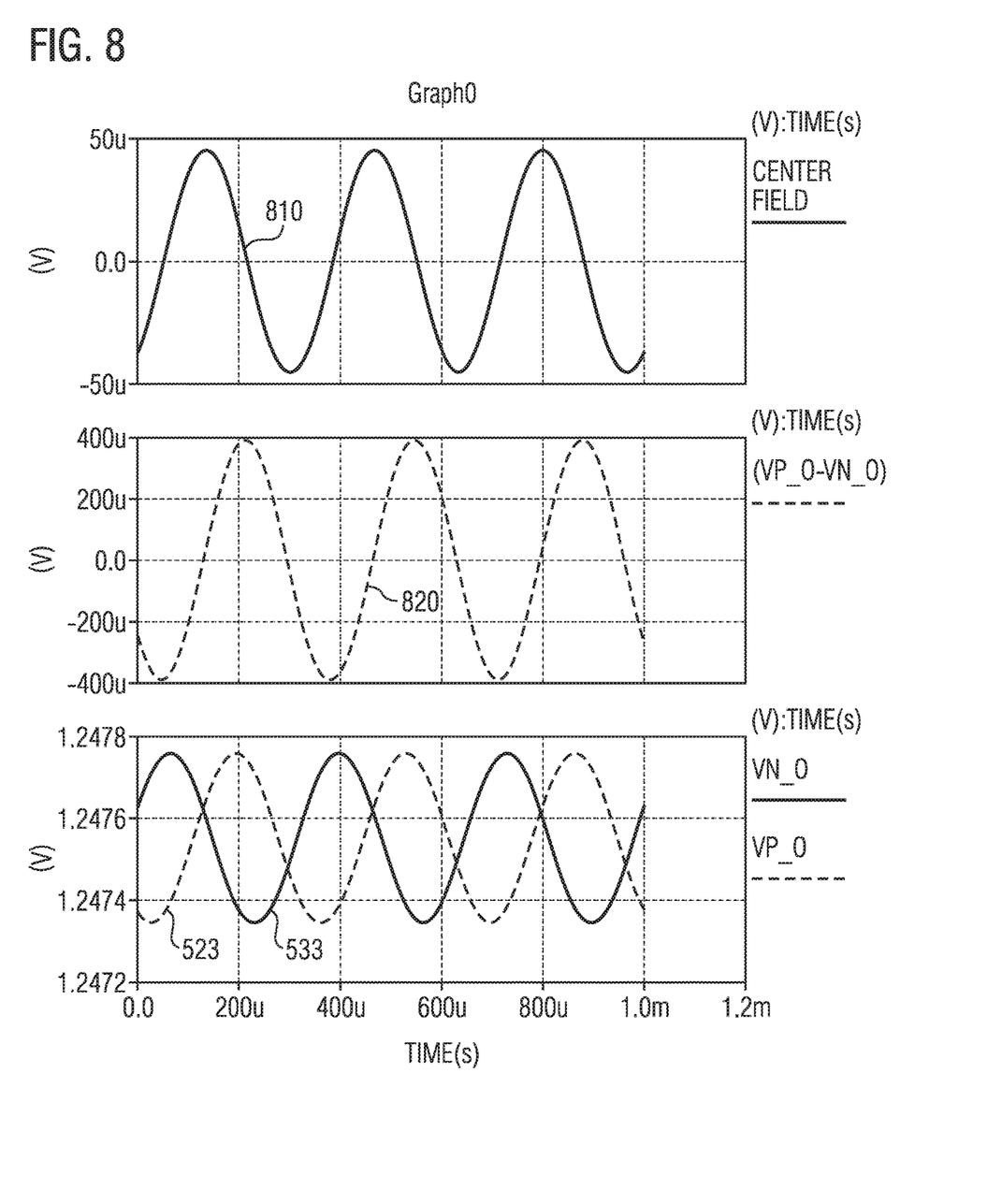
FIG. 8 illustrates an example of output signals of the magnetic sensor device of FIG. 5 in the first mode of operation.
Figure 9:
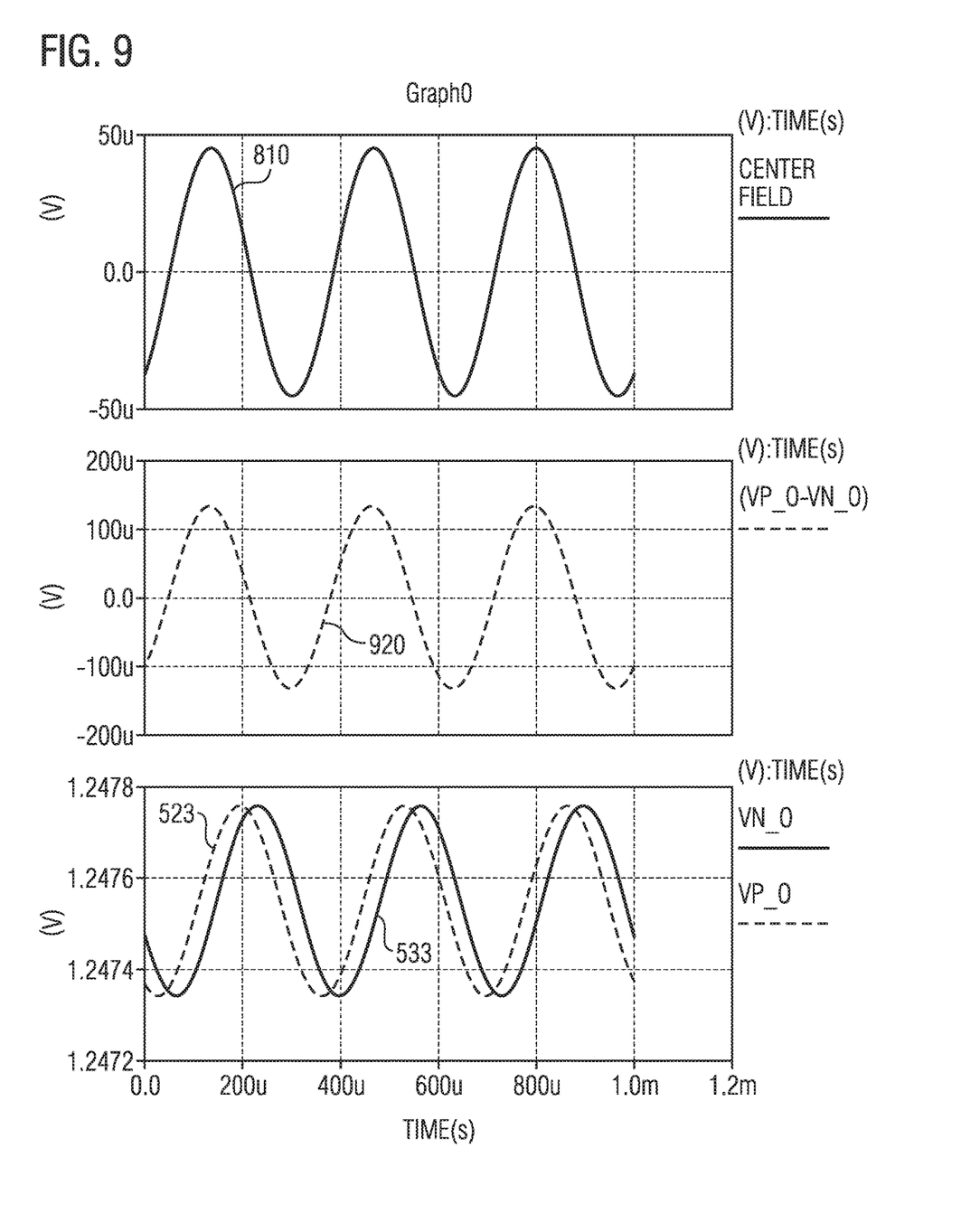
FIG. 9 illustrates an example of output signals of the magnetic sensor device of FIG. 5 in the second mode of operation.

The relation of the output signals 523, 533 for the first and second mode of operation is illustrated in FIGS. 8 and 9.

FIG. 8 illustrates in its upper part the temporal course 810 of the magnetic field of a magnetic component which rotates about a rotation axis. The associated output signals 523, 533 of the half-bridges 520, 530 of the magnetic sensor device 500 in the first mode of operation are illustrated in the lower part of FIG. 8.

In the middle part of FIG. 8, the differential output signal 820 of the first half-bridge and the second half-bridge (i.e. the difference between the output signals 523, 533) is illustrated. It is evident from FIG. 8 that the differential output signal 820 is shifted by 90° with respect to the temporal course 810 of the sensed magnetic field. That is, the differential output signal 820 shows the same phase behavior than a differential output signal of a conventional sensor device based on a magnetoresistive effect. Accordingly, the differential output signal may be supplied to further processing elements (e.g. an ECU) expecting output signals of a sensor device based on a magnetoresistive effect.

FIG. 9 illustrates in its upper part the same temporal course 810 of the magnetic field as FIG. 8. The associated output signals 523, 533 of the half-bridges 520, 530 of the magnetic sensor device 500 in the second mode of operation are illustrated in the lower part of FIG. 8. It is evident from FIG. 9 that the output signal 523 of the first half-bridge 520 is equal to the one of the first mode of operation, however, the output signal 533 of the second half-bridge 530 is phase shifted by 90° compared to the first mode of operation.

In the middle part of FIG. 9, the differential output signal 920 of the first half-bridge and the second half-bridge in the second mode of operation is illustrated. It is evident from FIG. 9 that the differential output signal 920 has the same phase as the temporal course 810 of the sensed magnetic field. That is, the differential output signal 920 shows the same phase behavior than a differential output signal of a conventional sensor device based on the Hall effect. Accordingly, the differential output signal may be supplied to further processing elements (e.g. an ECU) expecting output signals of a sensor device based on the Hall effect.

The first mode of operation may allow to operate the magnetic sensor device 500 such that a differential output signal of the first half-bridge 520 and the second half-bridge 530 is obtained which is 90° phase shifted with respect to a magnetic field that is sensed by the magnetic sensor device 500. By swapping the electric potentials for one of the two half-bridges in the second mode, the output signal of this half-bridge may be shifted in phase by 90°. In the second mode of operation a differential output signal of the first half-bridge 520 and the second half-bridge 530 may, hence, be obtained which is substantially in phase with the magnetic field that is sensed by the magnetic sensor device 500. Accordingly, a differential output signal of the magnetic sensor device may in the second mode of operation be supplied to further processing elements which expect the phase behavior of a Hall effect based sensor device. The proposed magnetic sensor device 500 may, hence, be used with further processing elements which are designed for sensor devices based on a magnetoresistive effect as well as with further processing elements which are designed for Hall effect based sensor devices. For example, in the automotive industry, the proposed magnetic sensor device may be used with ECUs which are designed for sensor devices based on a magnetoresistive effect as well as with ECUs which are designed for Hall effect based sensor devices. In other words, the second mode of operation may be understood as a Hall compatibility mode.

It is important to note that the phase shift between the single-ended signals (i.e. the two output signals of the half-bridges) is present in both modes of operation so that direction detection is possible (e.g. according to the concept discussed in connection with FIGS. 1 to 4).

In order to transmit the information, any magnetic sensor device disclosed herein may use an AK or PWM protocol on their respective output pin(s).

Figure 10:
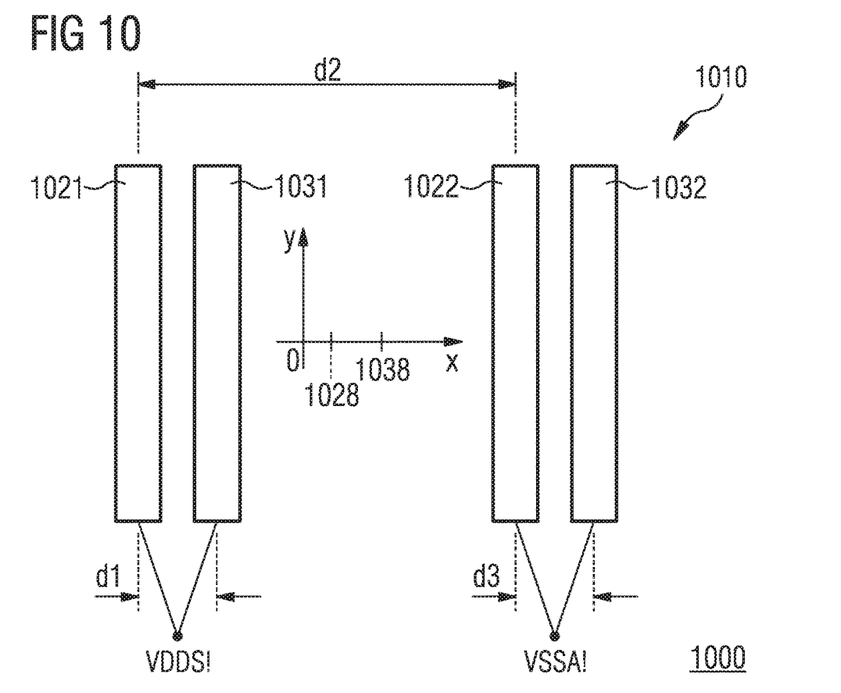
FIG. 10 illustrates another example of a magnetic sensor device.

FIG. 10 illustrates another magnetic sensor device 1000. The magnetic sensor device comprises a bridge circuit 1010 with a first half-bridge and a second half-bridge. For the sake of simplicity, merely the resistive elements of the magnetic sensor device's bridge circuit are illustrated in FIG. 10. The bridge circuit 1010 may, e.g., be arranged on a semiconductor chip (not illustrated).

A first resistive element 1031 of the second half-bridge is arranged between a first resistive element 1021 and a second resistive element 1022 of the first half-bridge along a spatial direction x. At least one of the first resistive element 1021 and the second resistive element 1022 of the first half-bridge comprises a magnetoresistive structure. For example, the first resistive element 1021 may comprise a GMR structure. Also the second resistive element 1022 may comprise a magnetoresistive structure (e.g. a GMR structure). That is, the first half-bridge may comprise a first magnetoresistive structure (first resistive element 1021) and a second magnetoresistive structure (second resistive element 1022) connected in series.

The second resistive element 1022 of the first half-bridge is arranged between the first resistive element 1031 of the second half-bridge and a second resistive element 1032 of the second half-bridge along the spatial direction x. At least one of the first resistive element 1031 and the second resistive element 1032 of the second half-bridge comprises a magnetoresistive structure. For example, the first resistive element 1031 may comprise a GMR structure. Also the second resistive element 1032 may comprise a magnetoresistive structure (e.g. a GMR structure). That is, the second half-bridge may comprise a third magnetoresistive structure (first resistive element 1031) and a fourth magnetoresistive structure (second resistive element 1032) connected in series.

As illustrated in FIG. 10, the resistive elements 1021 and 1031 may be separated from each other by a distance d1, the resistive elements 1022 and 1032 may be separated from each other by a distance d3 and the resistive elements 1021 and 1022 may be separated from each other by a distance d2. For example, the distances d1 and d3 may be 0.2 mm, and the distance d2 may be 1.4 mm. As a consequence, a geometric center 1028 of the first half-bridge is different from a geometric center 1038 of the second half-bridge. That is, the geometric centers of the first half-bridge and the second half-bridge are displaced with respect to each other along the spatial direction x. If the two half-bridges do not share the same geometric center, a phase shift between the respective output signals of the half-bridges may be obtained in case a nearby magnetic component (not illustrated) rotates about a rotation axis. The phase shift between the single-ended signals (i.e. the two output signals of the half-bridges) may be used to detect the direction of the magnetic component about the rotation axis (e.g. according to the concept discussed in connection with FIGS. 1 to 4).

The first resistive element 1021 of the first half-bridge and the first resistive element 1031 of the second half-bridge are coupled to a first electric potential (VDDS). The second resistive element 1022 of the first half-bridge and the second resistive element 1032 of the second half-bridge are coupled to a second electric potential (VSSA) which is different from the first electric potential.

The arrangement of the individual resistive elements in combination with the proposed coupling to the two electric potentials may allow to generate (obtain) a differential output signal of the first half-bridge and the second half-bridge which is substantially in phase with the magnetic field of the magnetic component rotating about the rotation axis. Accordingly, a differential output signal of the magnetic sensor device 1000 may be supplied to further processing elements (e.g. an ECU of an automotive vehicle) which expect the phase behavior of a Hall effect based sensor device, i.e., which are designed for Hall effect based sensor devices.

Figure 11:
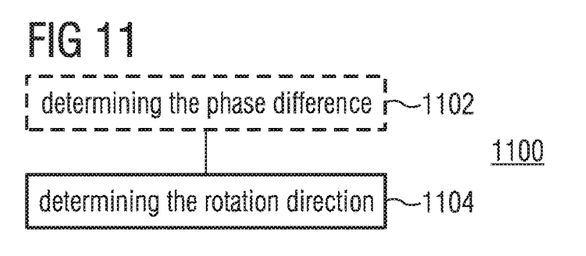
FIG. 11 illustrates a flowchart of an example of a method for determining a rotation direction of a magnetic component about a rotation axis.

An example of a method 1100 for determining a rotation direction of a magnetic component about a rotation axis using a bridge circuit with a first half-bridge and a second half-bridge is illustrated by means of a flowchart in FIG. 11. In this respect, each of the first half-bridge and the second half-bridge comprises at least one magnetoresistive structure. The method 1100 comprises determining 1104 the rotation direction of the magnetic component based on a phase difference between an output signal of the first half-bridge and an output signal of the second half-bridge.

Optionally, the method 1100 may comprise determining 1102 the phase difference between the output signal of the first half-bridge and the output signal of the second half-bridge based on a phase difference between a crossing of a first predefined value (e.g. zero) of the output signal of the first half-bridge and a crossing of a first predefined value (e.g. zero) of the output signal of the second half-bridge, or based on a phase difference between an extremum of the output signal of the first half-bridge and an extremum of the output signal of the second half-bridge.

Further optionally, the method 1100 may comprise coupling a first input node of the first half-bridge and a first input node of the second half-bridge to a first electric potential and a second input node of the first half-bridge and a second input node of the second half-bridge to a second electric potential in a first mode of operation, and coupling the first input node of the first half-bridge and the second input node of the second half-bridge to the first electric potential and the second input node of the first half-bridge and the first input node of the second half-bridge to the second electric potential in a second mode of operation.

More details and aspects of the method are mentioned in connection with the proposed concept or one or more examples described above (e.g. FIGS. 1-4). The method may comprise one or more additional optional features corresponding to one or more aspects of the proposed concept or one or more examples described above.

Figure 12:
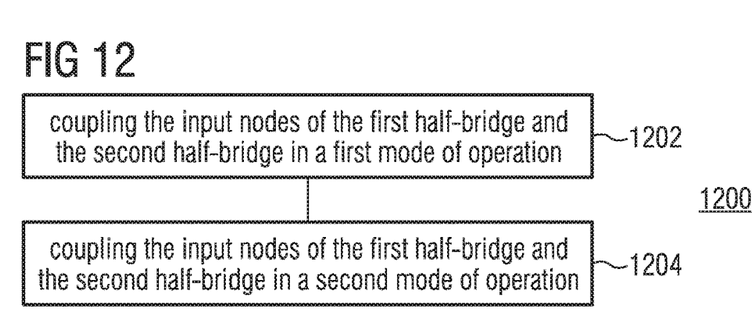
FIG. 12 illustrates a flowchart of an example of a method for operating a magnetic sensor device.

An example of a method 1200 for operating a magnetic sensor device comprising a bridge circuit with a first half-bridge and a second half-bridge is illustrated by means of a flowchart in FIG. 12. In this respect, each of the first half-bridge and the second half-bridge comprises at least one magnetoresistive structure. The method 1200 comprises coupling 1202 a first input node of the first half-bridge and a first input node of the second half-bridge to a first electric potential and a second input node of the first half-bridge and a second input node of the second half-bridge to a second electric potential in a first mode of operation. Further, the method 1200 comprises coupling 1204 the first input node of the first half-bridge and the second input node of the second half-bridge to the first electric potential and the second input node of the first half-bridge and the first input node of the second half-bridge to the second electric potential in a second mode of operation.

More details and aspects of the method are mentioned in connection with the proposed concept or one or more examples described above (e.g. FIGS. 5-9). The method may comprise one or more additional optional features corresponding to one or more aspects of the proposed concept or one or more examples described above.

The aspects and features mentioned and described together with one or more of the previously detailed examples and figures, may as well be combined with one or more of the other examples in order to replace a like feature of the other example or in order to additionally introduce the feature to the other example.

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A magnetic sensor device for determining a rotation direction of a magnetic component about a rotation axis, comprising:
    a bridge circuit with a first half-bridge and a second half-bridge, wherein each of the first half-bridge and the second half-bridge comprises at least one magnetoresistive structure;
    an evaluation circuit configured to determine the rotation direction of the magnetic component based on a phase difference between an output signal of the first half-bridge and an output signal of the second half-bridge; and
    a switching circuit configured to couple a first input node of the first half-bridge and a first input node of the second half-bridge to a first electric potential and a second input node of the first half-bridge and a second input node of the second half-bridge to a second electric potential in a first mode of operation, and to couple the first input node of the first half-bridge and the second input node of the second half-bridge to the first electric potential and the second input node of the first half-bridge and the first input node of the second half-bridge to the second electric potential in a second mode of operation.

2. The magnetic sensor device of claim 1, wherein the output signal of the first half-bridge indicates a potential difference between a reference potential and a potential at an output node of the first half-bridge, and wherein the output signal of the second half-bridge indicates a potential difference between a reference potential and a potential at an output node of the second half-bridge.

3. The magnetic sensor device of claim 1, wherein the evaluation circuit is further configured to determine the phase difference between the output signal of the first half-bridge and the output signal of the second half-bridge based on a phase difference between a crossing of a first predefined value of the output signal of the first half-bridge and a crossing of a second predefined value of the output signal of the second half-bridge, or based on a phase difference between an extremum of the output signal of the first half-bridge and an extremum of the output signal of the second half-bridge.

4. The magnetic sensor device of claim 1, wherein the first half-bridge is displaced with respect to the second half-bridge to generate the output signal of the first half-bridge phase shifted with respect to the output signal of the second half-bridge in case the magnetic component rotates about the rotation axis.

5. The magnetic sensor device of claim 1, wherein a geometric center of the first half-bridge is configured about the rotation axis at a different position with respect to a geometric center of the second half-bridge.

6. The magnetic sensor device of claim 1, wherein the first half-bridge comprises a first magnetoresistive structure and a second magnetoresistive structure connected in series, and wherein the second half-bridge comprises a third magnetoresistive structure and a fourth magnetoresistive structure connected in series.

7. The magnetic sensor device of claim 1, wherein the magnetic component comprises at least one magnetic pole of a first polarization and at least one magnetic pole of a different second polarization which are arranged alternatively along the rotation direction of the magnetic component.

8. The magnetic sensor device of claim 1, wherein the magnetic component comprises at least one tooth and an adjoining slot.

9. A magnetic sensor device comprising:
    a bridge circuit with a first half-bridge and a second half-bridge,
        wherein a first resistive element of the second half-bridge is arranged between a first resistive element and a second resistive element of the first half-bridge along a spatial direction,
        wherein the second resistive element of the first half-bridge is arranged between the first resistive element of the second half-bridge and a second resistive element of the second half-bridge along the spatial direction,
        wherein the first resistive element of the first half-bridge and the first resistive element of the second half-bridge are coupled to a first electric potential,
        wherein the second resistive element of the first half-bridge and the second resistive element of the second half-bridge are coupled to a second electric potential,
        wherein at least one of the first resistive element and the second resistive element of the first half-bridge comprises a magnetoresistive structure,
        wherein at least one of the first resistive element and the second resistive element of the second half-bridge comprises a magnetoresistive structure, and
        wherein a geometric center of the first half-bridge is different from a geometric center of the second half-bridge; and
    a switching circuit configured to couple a first input node of the first half-bridge and a first input node of the second half-bridge to the first electric potential and a second input node of the first half-bridge and a second input node of the second half-bridge to the second electric potential in a first mode of operation, and to couple the first input node of the first half-bridge and the second input node of the second half-bridge to the first electric potential and the second input node of the first half-bridge and the first input node of the second half-bridge to the second electric potential in a second mode of operation.

10. The magnetic sensor device of claim 9, wherein an output signal of the first half-bridge indicates a potential difference between a reference potential and a potential at an output node of the first half-bridge, and wherein an output signal of the second half-bridge indicates a potential difference between a reference potential and a potential at an output node of the second half-bridge.

11. The magnetic sensor device of claim 9, further comprising:
an evaluation circuit configured to determine a phase difference between an output signal of the first half-bridge and an output signal of the second half-bridge based on a phase difference between a crossing of a first predefined value of the output signal of the first half-bridge and a crossing of a second predefined value of the output signal of the second half-bridge, or based on a phase difference between an extremum of the output signal of the first half-bridge and an extremum of the output signal of the second half-bridge.

12. The magnetic sensor device of claim 9, wherein the first half-bridge is displaced with respect to the second half-bridge to generate an output signal of the first half-bridge phase shifted with respect to an output signal of the second half-bridge.

13. The magnetic sensor device of claim 9, wherein a geometric center of the first half-bridge is configured about a rotation axis at a different position with respect to a geometric center of the second half-bridge.

14. The magnetic sensor device of claim 9, wherein the first half-bridge comprises a first magnetoresistive structure and a second magnetoresistive structure connected in series, and wherein the second half-bridge comprises a third magnetoresistive structure and a fourth magnetoresistive structure connected in series.

15. A method for determining a rotation direction of a magnetic component about a rotation axis using a bridge circuit with a first half-bridge and a second half-bridge, wherein each of the first half-bridge and the second half-bridge comprises at least one magnetoresistive structure, the method comprising:
determining the rotation direction of the magnetic component based on a phase difference between an output signal of the first half-bridge and an output signal of the second half-bridge;
coupling a first input node of the first half-bridge and a first input node of the second half-bridge to a first electric potential and a second input node of the first half-bridge and a second input node of the second half-bridge to a second electric potential in a first mode of operation; and
coupling the first input node of the first half-bridge and the second input node of the second half-bridge to the first electric potential and the second input node of the first half-bridge and the first input node of the second half-bridge to the second electric potential in a second mode of operation.

16. The method of claim 15, wherein the output signal of the first half-bridge indicates a potential difference between a reference potential and a potential at an output node of the first half-bridge, and wherein the output signal of the second half-bridge indicates a potential difference between a reference potential and a potential at an output node of the second half-bridge.

17. The method of claim 15, wherein the method further comprises determining the phase difference between the output signal of the first half-bridge and the output signal of the second half-bridge based on a phase difference between a crossing of a first predefined value of the output signal of the first half-bridge and a crossing of a second predefined value of the output signal of the second half-bridge, or based on a phase difference between an extremum of the output signal of the first half-bridge and an extremum of the output signal of the second half-bridge.

18. The method of claim 15, wherein the first half-bridge is displaced with respect to the second half-bridge to generate the output signal of the first half-bridge phase shifted with respect to the output signal of the second half-bridge in case the magnetic component rotates about the rotation axis.

19. The method of claim 15, wherein a geometric center of the first half-bridge is configured about the rotation axis at a different position with respect to a geometric center of the second half-bridge.

20. The method of claim 15, wherein the first half-bridge comprises a first magnetoresistive structure and a second magnetoresistive structure connected in series, and wherein the second half-bridge comprises a third magnetoresistive structure and a fourth magnetoresistive structure connected in series.

* * * * *